M. LAUFENBURG.
GRAIN-SEPARATOR.
No. 172,038. Patented Jan. 11, 1876.
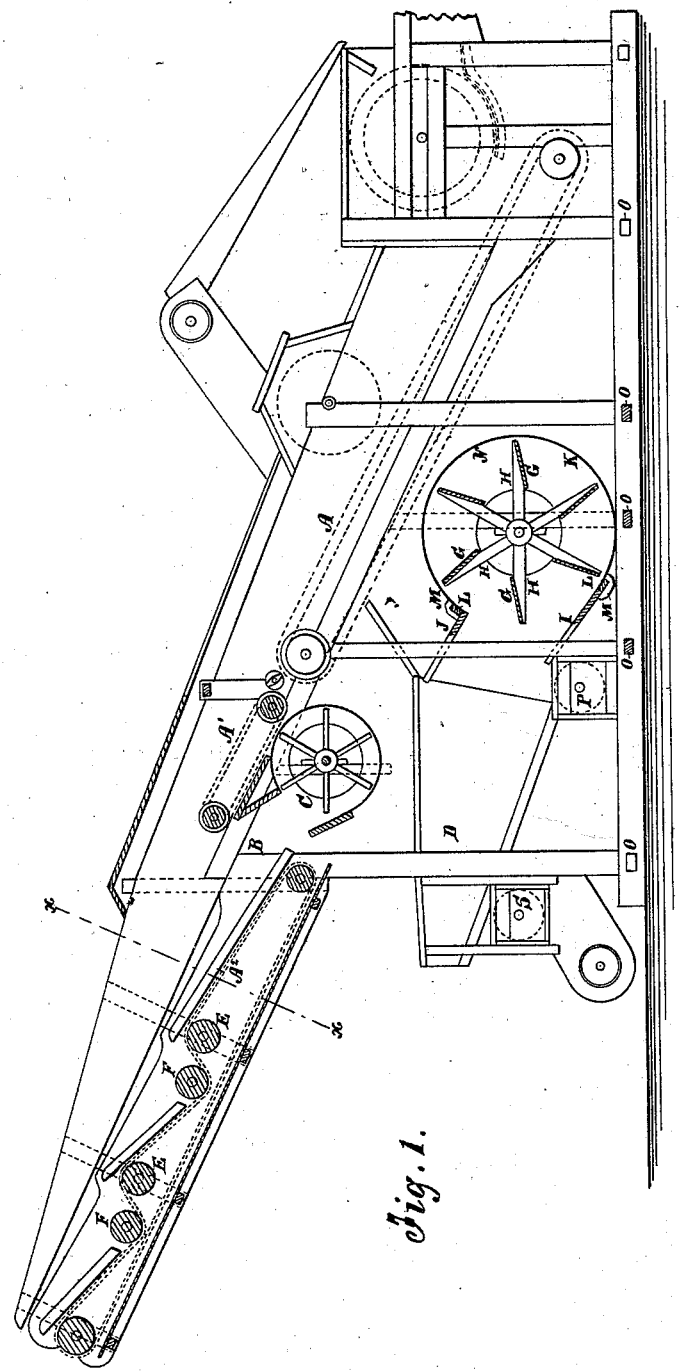
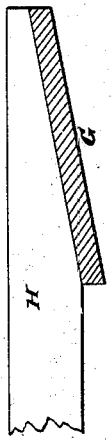
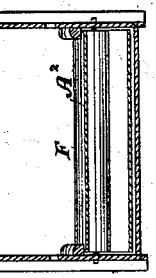

UNITED STATES PATENT OFFICE.

MICHAEL LAUFENBURG, OF SAN FRANCISCO, CALIFORNIA, ASSIGNOR TO TREADWELL & CO., OF SAME PLACE.

IMPROVEMENT IN GRAIN-SEPARATORS.

Specification forming part of Letters Patent No. 172,038, dated January 11, 1876; application filed January 25, 1875.

*To all whom it may concern:*

Be it known that I, MICHAEL LAUFENBURG, of San Francisco, in the county of San Francisco and State of California, have invented a new and useful Improvement in Thrashing-Machine, of which the following is a specification:

The invention will first be fully described, and then pointed out in claim.

Figure 1 is a longitudinal sectional elevation of my improved machine. Fig. 2 is a transverse section on the line $x\,x$ of Fig. 1; and Fig. 3 is a detail of one of the fan-blades in section, showing its inclination of the blade to the arm of the fan.

The break which I propose to make in the straw-carrier A, A$^1$, and A$^2$ is represented at B, making a fall of a few inches for the straw and grain, before which I arrange the fan C, so as to prevent the straw from falling through the space with the grain, which drops onto the screening-shoe D. E and F represent the rollers, two or more pairs of which are journaled on the inside of the frame. Over and under these rollers alternately is passed the open endless carrier-belt A$^2$, which is thus caused to move in an undulating course, and thereby agitate the straw, so as the more effectually to separate the grain therefrom. G represents the blades of the principal fan, on a pitch or inclination to the arms H of one and a half to eight inches, in combination with the wind-board I, arranged at an angle of thirty-four degrees to the plane of the fan and shoe, and the board J arranged at thirty degrees thereto. K is the sheet-metal case of the principal fan, which I fasten at each end to a cross-bar, L, bind it around the fan on the cleats N, and secure the bars L detachably to the sides of the case by clips M, bolted or screwed to it, so that when one of the sides of the machine-case is taken off the fan can be readily taken apart, which allows of taking the case apart for packing, for which, in combination with the detachable fan-case, I make the cross-pieces or girts O connecting the side frames detachably. I also make the grain-conveyer P detachable for the same purpose by fitting it so as to slide into its place from one side, when the case side is removed, and be held in place by the case sides when the machine is put together.

I am aware that Patent No. 30,099 exhibits a machine somewhat similar in appearance to mine, but essentially different in the mode of operation. In that patent the fan-blower is described as being arranged on the inside of carrier-belt, while it throws a blast against one, but not between two separate belts. On the other hand, after this winnowing operation, under the patented machine the straw, together with what grain may remain in it, passes directly to the stack, while the upper half of my carrier passes over and under guide-rolls at different elevations, so that he straw is shaken repeatedly on the open-work belt and the remaining grain caused to fall upon a subjacent chute. From this chute the grain is dropped in front of another fan, G H, that detaches any dust, and thence into a shaking-shoe, D. By this organization of mechanism the straw undergoes such a thorough sifting that no grain that has been loosened from the head can well be carried off to the stack.

What I claim as new is—

The combination of open endless belt A$^1$, fan C, and open endless belt A$^2$, the upper surface of the latter being made to move in an undulating course by suitable mechanism, all substantially as and for the purpose specified.

MICHAEL LAUFENBURG.

Witnesses:
A. P. THAYER,
ALEX. F. ROBERTS.